(12) United States Patent
Neighbors

(10) Patent No.: US 8,833,704 B1
(45) Date of Patent: Sep. 16, 2014

(54) COOKING PAN SUPPORT APPARATUS

(76) Inventor: Gail Neighbors, Novato, CA (US)

( * ) Notice: Subject to any disclaimer, the term of this patent is extended or adjusted under 35 U.S.C. 154(b) by 20 days.

(21) Appl. No.: 13/214,805

(22) Filed: Aug. 22, 2011

(51) Int. Cl.
A47G 21/14 (2006.01)

(52) U.S. Cl.
USPC .......................................... 248/37.3; 248/37.6

(58) Field of Classification Search
USPC .......... 248/117.1, 117.2, 117.4, 117.6, 117.7, 248/37.3, 176.2, 146, 154, 37.6; D7/361; 211/45, 85.31, 181.1; 294/99.1, 992
See application file for complete search history.

(56) References Cited

U.S. PATENT DOCUMENTS

| 1,612,521 | A |   | 12/1926 | McNaughton |
| 1,831,493 | A | * | 11/1931 | Holtzman ...................... 248/351 |
| 2,522,223 | A | * | 9/1950 | Hardin et al. .............. 248/124.2 |
| 2,614,779 | A | * | 10/1952 | Peterson et al. ........... 248/117.2 |
| 2,778,679 | A | * | 1/1957 | Lear .......................... 239/214.21 |
| 2,871,848 | A |   | 2/1959 | Wall et al. |
| 3,086,448 | A |   | 4/1963 | Forman |
| 3,215,063 | A |   | 11/1965 | Olson et al. |
| 4,607,608 | A | * | 8/1986 | Allred et al. .................... 126/30 |
| 4,762,979 | A | * | 8/1988 | Geoffroi ...................... 219/242 |
| 4,923,234 | A | * | 5/1990 | Fairley ......................... 294/99.2 |
| 5,381,989 | A | * | 1/1995 | Jackson ................... 248/231.51 |
| 5,850,779 | A |   | 12/1998 | Zimmerman |
| 8,272,601 | B2 | * | 9/2012 | Kocher ......................... 248/121 |

* cited by examiner

Primary Examiner — Alfred J Wujciak
(74) Attorney, Agent, or Firm — Larry D. Johnson

(57) ABSTRACT

A support apparatus to releasably attach to the handle of a frying pan, skillet, or other type of handle-bearing cookware to lift the cooking pan at an angle relative to a stove cooktop or other surface to drain grease, sauce, or other liquid to the edge of the pan and away from the food in the pan. The apparatus includes a jaw or clamp portion for releasable capture of the pan handle; a body portion including a spring portion to provide a spring tension to the clamp portion; and a base portion to rest and stabilize the apparatus on a stove cooktop, kitchen countertop, or other surface.

4 Claims, 2 Drawing Sheets ns, 704 B1

COOKING PAN SUPPORT APPARATUS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to cookware and coking utensils, and more particularly to an improved support apparatus for use with frying pans, skillets, and other types of handle-bearing cookware.

BACKGROUND INFORMATION AND DISCUSSION OF RELATED ART

U.S. Pat. No. 1,612,521 to McNaughton discloses an attachment for the handle of a skillet that prevents the weight of the handle from tilting the skillet.

U.S. Pat. No. 2,871,848 to Wall et al. describes a wedge to be inserted under a frying pan to maintain it in an inclined position.

U.S. Pat. No. 3,086,448 to Forman teaches a tiltable cooking utensil with a leg pivotally mounted on the utensil for movement between a retracted position and a downwardly extending position in which it supports the cooking surface in an inclined position.

U.S. Pat. No. 3,215,063 to Olson et al. discloses a height adjustable support for a fry pan.

U.S. Pat. No. 5,850,779 to Zimmerman describes a pan tilting apparatus adapted to rest on a top surface of an oven, surrounding a burner of the oven, to support a pan such that the pan is tilted and positioned above the burner. The structure further comprises a barrier depending outwardly from the structure for keeping the pan from sliding off of the structure.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention provides a cooking pan support apparatus adapted to releasably attach to the handle of a frying pan, skillet, or other type of handle-bearing cookware to lift the cooking pan at an angle relative to a stove cooktop or other surface to drain grease, sauce, or other liquid to the edge of the pan and away from the food in the pan. The inventive support apparatus includes a jaw or clamp portion for releasable capture of the pan handle; a body portion including a spring portion to provide a spring tension to the clamp portion; and a base portion to rest and stabilize the apparatus on a stove cooktop, kitchen countertop, or other surface.

In the preferred embodiment, the support apparatus is constructed of spring steel, wire, or other suitable material, with the clamp, body, and base portions formed from generally contiguous segments of wire. Squeezing the sides of the body portion opens the clamp jaws so that they may be placed around and engage the pan handle, and releasing the sides of the body portion closes the clamp jaws around the pan handle such that the spring tension grips and holds the pan handle in place. The base portion may be formed as a pair of leg portions of any suitable length terminating in wide, stable feet, such that the legs can straddle the grates on gas stoves, and the feet can rest on the stovetop itself. Slip-resistant non-stick silicone covers or bands on the base provide additional stability to the apparatus, particularly on potentially wet or greasy surfaces such as a stovetop or countertop.

The height that the cooking pan handle is raised, and therefore the angle at which the cooking pan is inclined, can easily be adjusted by attaching the clamp portion of the inventive support apparatus at various positions along the length of the pan handle. For example, the clamp portion can be placed at the base of the handle (i.e., closest to the pan) for the highest angle, or at the end of the handle (i.e., farthest from the pan) for the lowest angle, or anywhere in-between.

It is therefore an object of the present invention to provide a new and improved support apparatus for use with frying pans, skillets, and other handle-bearing cookware.

It is another object of the present invention to provide a new and improved support apparatus to releasably attach to the handle of a frying pan, skillet, or other handle-bearing cookware to lift the cooking pan at an angle to drain grease, sauce, or other liquid to the edge of the pan and away from the food in the pan.

A further object or feature of the present invention is a new and improved support apparatus for a cooking pan that can straddle the grates on gas stoves, and rest on the stovetop itself.

An even further object of the present invention is to provide a novel support apparatus for a cooking pan so that the angle at which the pan is inclined can easily be adjusted.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
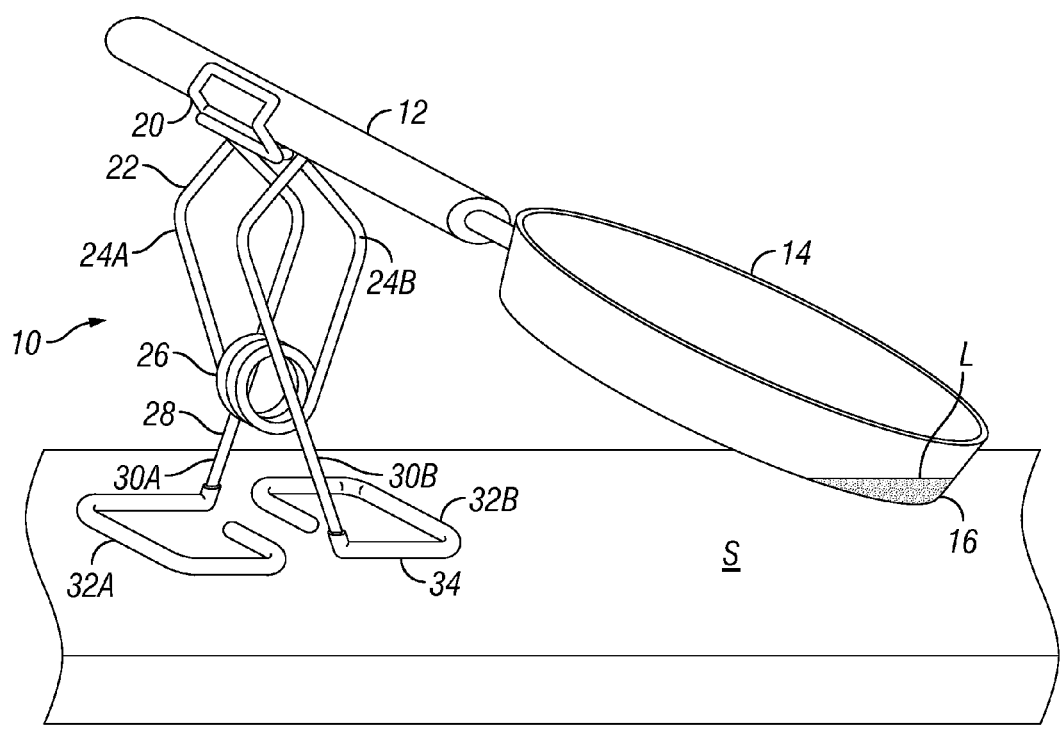
FIG. 1 is a perspective view of a cooking pan support apparatus of this invention as placed on the handle of a cooking pan, elevating the handle and inclining the pan so that liquid in the pan drains to a bottom edge of the pan.
Figure 2:
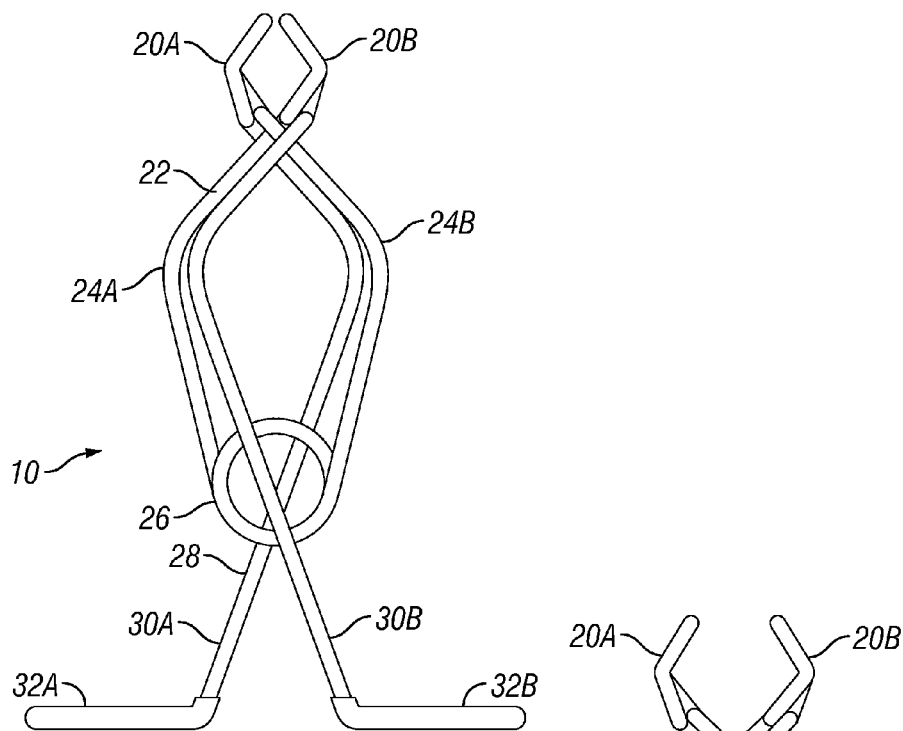
FIG. 2 is a side elevation view of the cooking pan support apparatus in its normally closed configuration.
Figure 3:
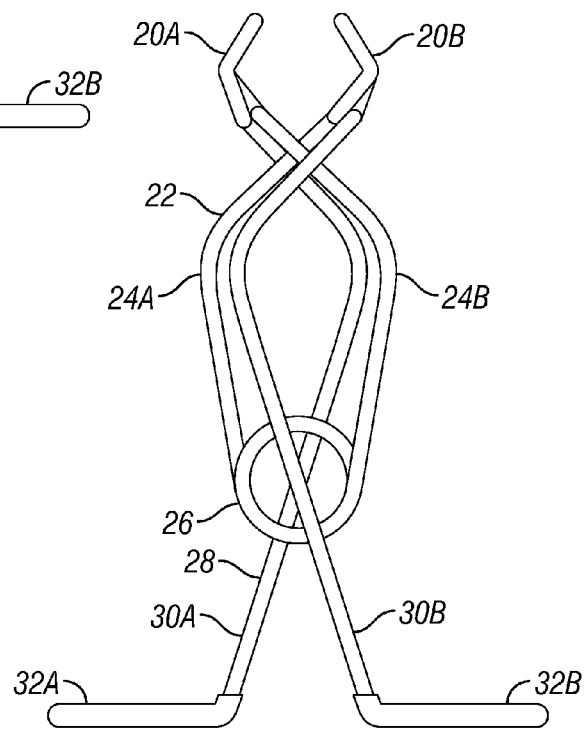
FIG. 3 is a side elevation view of the cooking pan support apparatus in its open configuration for capture of the handle of a pan.

Referring to FIGS. 1 through 3, wherein like reference numerals refer to like components in the various views, there is illustrated therein a new and improved cooking pan support apparatus, generally denominated 10 herein.

FIG. 1 is a perspective view of the cooking pan support apparatus 10 as placed on the handle 12 of a pan 14, elevating the handle and inclining the pan so that liquid L in the pan drains to a bottom edge 16 of the pan. The inventive support apparatus 10 includes a jaw or clamp portion 20 for releasable capture of the pan handle 12; a body portion 22 including a pair of sides 24A, 24B and a coiled spring portion 26 to provide a spring tension to the clamp portion 20; and a base portion 28 including a pair of legs 30A, 30B terminating in a pair of feet 32A, 32B to rest and stabilize the apparatus on a stove cooktop, kitchen countertop, or other surface S.

In the preferred embodiment, the support apparatus is constructed of spring steel, wire, or other suitable material, with the clamp portion 20, body portion 22, and base portion 28 all formed from generally contiguous segments of wire. The legs 30A, 30B are spaced apart so that they can straddle the grates on gas stoves. The wide, stable feet 32A, 32B can rest on the stovetop, countertop, or other surface, and may be covered with a band or sleeve 34 of silicone, rubber, or other slip-resistant, non-stick material. Similarly, the clamp portion 20 may covered with a slip-resistant material to facilitate gripping of the pan handle.

FIG. 2 is a side elevation view of the cooking pan support apparatus 10 in its normally spring-biased closed configuration; while FIG. 3 illustrates the open configuration for capture of the handle of a pan. Squeezing the sides 24A, 24B of the body portion 22 (FIG. 3) opens the clamp jaws 20A, 20B so that they may be placed around and engage a pan handle, and releasing the sides 24A, 24B of the body portion 22 (FIG. 2) closes the clamp jaws 20A, 20B around the pan handle such that the tension from spring 26 grips and holds the pan handle in place.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A support apparatus for a cooking pan having a handle, said support apparatus comprising:
    a clamp portion comprising a pair of jaws for releasable capture of the cooking pan handle, said clamp portion having an open configuration and a closed configuration;
    a body portion juxtaposed with said clamp portion, said body portion comprising a pair of sides and including a coiled spring portion to provide a spring bias to said clamp portion; and
    a base portion to support said apparatus on a surface, wherein said clamp portion, body portion, and base portion are formed from generally contiguous segments of wire, wherein squeezing said sides of said body portion opens said pair of jaws so that they may be placed around the pan handle, and releasing said sides of said body portion closes said pair of jaws around the pan handle such that spring tension grips and holds the pan handle in place, and wherein attaching said clamp portion to the cooking pan handle lifts the cooking pan at an angle to drain liquid to an edge of the pan.

2. The support apparatus of claim 1 wherein said base portion comprises a pair of legs terminating in a pair of feet.

3. The support apparatus of claim 2 wherein said feet comprise a slip-resistant material.

4. The support apparatus of claim 1 wherein said support apparatus is constructed of spring steel.

\* \* \* \* \*